(12) United States Patent
Nenner et al.

(10) Patent No.: US 10,897,425 B2
(45) Date of Patent: Jan. 19, 2021

(54) METHOD FOR HANDLING COMMUNICATION BETWEEN A TELECOMMUNICATIONS NETWORK AND A USER EQUIPMENT

(71) Applicant: Deutsche Telekom AG, Bonn (DE)

(72) Inventors: Karl-Heinz Nenner, Bornheim (DE); Dieter Gludovacz, Trumau (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/070,784

(22) PCT Filed: Jan. 11, 2017

(86) PCT No.: PCT/EP2017/050483
§ 371 (c)(1),
(2) Date: Jul. 18, 2018

(87) PCT Pub. No.: WO2017/125295
PCT Pub. Date: Jul. 27, 2017

(65) Prior Publication Data
US 2019/0028395 A1    Jan. 24, 2019

(30) Foreign Application Priority Data
Jan. 19, 2016    (EP) ..................................... 16151833

(51) Int. Cl.
*H04L 12/851*    (2013.01)
*H04W 28/02*    (2009.01)
(Continued)

(52) U.S. Cl.
CPC .......... *H04L 47/2408* (2013.01); *H04L 12/66* (2013.01); *H04L 45/507* (2013.01); *H04L 47/2483* (2013.01); *H04W 28/0268* (2013.01)

(58) Field of Classification Search
CPC ............. H04L 47/2408; H04L 47/2483; H04L 45/507; H04L 12/66; H04W 28/0268
See application file for complete search history.

(56) References Cited

U.S. PATENT DOCUMENTS

| | | | |
|---|---|---|---|
| 6,865,185 B1 * | 3/2005 | Patel | H04L 47/12 370/310 |
| 2002/0114305 A1 | 8/2002 | Oyama et al. | |

(Continued)

FOREIGN PATENT DOCUMENTS

| | | |
|---|---|---|
| CN | 105227396 A | 1/2016 |
| EP | 2493134 A1 | 8/2012 |

(Continued)

*Primary Examiner* — Mohammad S Anwar
(74) *Attorney, Agent, or Firm* — Leydig, Voit & Mayer, Ltd.

(57) ABSTRACT

A method for handling communication between a telecommunications network and a user equipment includes using label information for indicating at least one service data flow such that any data packet belonging to the at least one service data flow and being transmitted in a direction from the user equipment to the gateway node or in a direction from the gateway node to the user equipment includes the label information and/or is transmitted with the label information. The label information indicates: a termination point of the at least one service data flow, both termination points of the at least one service data flow, and/or a quality-of-service level to be applied to the service data flow.

17 Claims, 1 Drawing Sheet

(51) Int. Cl.
*H04L 12/66* (2006.01)
*H04L 12/723* (2013.01)

(56) References Cited

U.S. PATENT DOCUMENTS

| | | | |
|---|---|---|---|
| 2004/0109455 | A1 | 6/2004 | Jouppi et al. |
| 2006/0234716 | A1* | 10/2006 | Vesterinen ........ H04W 72/1236 |
| | | | 455/450 |
| 2006/0274706 | A1 | 12/2006 | Chen et al. |
| 2008/0310334 | A1 | 12/2008 | Nakamura et al. |
| 2009/0252049 | A1 | 10/2009 | Ludwig et al. |
| 2010/0254386 | A1* | 10/2010 | Salinger ................ H04L 69/08 |
| | | | 370/392 |
| 2012/0063464 | A1* | 3/2012 | Mehta .................. H04W 28/02 |
| | | | 370/401 |
| 2012/0281536 | A1* | 11/2012 | Gell ...................... H04W 28/18 |
| | | | 370/235 |
| 2014/0086159 | A1* | 3/2014 | Sajadieh ............... H04W 72/12 |
| | | | 370/329 |
| 2014/0169271 | A1* | 6/2014 | Awano .................... H04W 8/12 |
| | | | 370/328 |
| 2014/0328288 | A1* | 11/2014 | Lu ...................... H04W 72/1242 |
| | | | 370/329 |
| 2016/0142321 | A1* | 5/2016 | Gage ....................... H04W 4/70 |
| | | | 370/235 |

FOREIGN PATENT DOCUMENTS

| | | |
|---|---|---|
| JP | 2008311974 A | 12/2008 |
| JP | 2009518904 A | 5/2009 |
| JP | 2015057901 A | 3/2015 |
| KR | 101488312 B1 | 1/2015 |

* cited by examiner

METHOD FOR HANDLING COMMUNICATION BETWEEN A TELECOMMUNICATIONS NETWORK AND A USER EQUIPMENT

CROSS REFERENCE TO RELATED APPLICATIONS

This application is a U.S. National Stage Application under 35 U.S.C. § 371 of International Application No. PCT/EP2017/050483 filed on Jan. 11, 2017, and claims benefit to European Patent Application Nos. EP 16151833.7 filed on Jan. 19, 2016. The International Application was published in English on Jul. 27, 2017 as WO 2017/125295 A1 under PCT Article 21(2).

FIELD

The present invention relates to a method for handling communication between a telecommunications network and a user equipment, wherein the communication between the telecommunications network and the user equipment comprises at least one service data flow, to a telecommunications network for handling communication between a telecommunications network and a user equipment, to a gateway node and a user equipment for handling communication between a telecommunications network and a user equipment, and to a program and to a computer program product for handling communication between a telecommunications network and a user equipment.

BACKGROUND

In conventional mobile communication networks (such as according to the GSM-standard/the UMTS-standard/the LTE-standard), when the user equipment needs IP connectivity, it has to connect to a so-called Packet Data Network (e.g. the Internet or a corporate VPN). This is typically done by activating a PDN connection. This is optional for mobile devices or user equipments camping on GSM mobile communication networks or UMTS mobile communication networks (as such user equipments are in any case CS (circuit switched)-attached), but mandatory for user equipments that attach to mobile communication networks according to the LTE-standard as there is no CS-domain in such mobile communication networks.

When a PDN connection is activated, a packet data network must be selected. The packet data network is identified by an Access Point Name (APN) which may be provided by the user equipment but can also be determined by the mobile communication network. When the user equipment connects to the packet data network, it also gets an IP address (Internet Protocol address) assigned (various methods are specified for IP address assignment).

In legacy networks, the activation of a PDN connection comprises the creation of a primary PDP context (Packet Data Protocol context). In the evolved packet core (EPC), it comprises the creation of a default bearer. The underlying concepts of both a PDP context and an EPC bearer are quite similar. A (possibly default) Quality of Service (QoS) profile is also assigned to the default bearer and to the primary PDP context upon its establishment. It is also possible to assign a packet filter to the bearer/context so that only packets matching the filter are allowed to flow through the corresponding bearer/context.

When another quality-of-service profile or a packet filter having other characteristics (i.e. another packet filter) is needed, either the existing quality-of-service profile and/or packet filter on the already established bearer/context may be modified, or an additional bearer/context sporting the new quality-of-service profile and/or packet filter is created. In legacy mobile communication networks, this is called a secondary PDP context, whereas in the evolved packet core, it is called a dedicated bearer. While there may be only one default bearer/primary PDP context, more than one dedicated bearer/secondary PDP context are allowed to operate on the same packet data network connection. While the quality-of-service profile and/or packet filter might be different between the default bearer and the dedicated bearer(s)/the primary PDP context and the secondary PDP context(s), they all connect to the same packet data network (i.e. use the same APN), and they all use the same IP address of the user equipment.

When it is necessary that a user equipment connects to another packet data network, it may open an additional packet data network connection. The same logic, in terms of bearers/PDP contexts, quality-of-service profiles, packet filters and user equipment address, apply here. If multiple packet data network connections exist, these are in principle independent of each other, though certain aspects (such as quality-of-service, packet filter) may be the same or overlap.

Typically, from the perspective of the mobile communication network, the packet data network connection terminates in the user equipment (downstream) and in a so-called Packet Data Network Gateway (upstream). The packet data networks that can be accessed on a given mobile communication network are then connected to the PDN Gateway, and it is the responsibility of the PDN Gateway to route the upstream packets to the proper packet data network. It can do this by mapping the bearer on which it receives the upstream packet to the packet data network this mapping is established upon opening a default or dedicated bearer, or primary or secondary PDP context, respectively. Downstream, data packets received from a given packet data network are mapped onto the appropriate bearer in order to apply the desired quality-of-service profile (i.e. the quality-of-service profile assigned to that bearer) to the data packet.

SUMMARY

In an embodiment, the present invention provides a method for handling communication between a telecommunications network and a user equipment. The communication between the telecommunications network and the user equipment includes at least one service data flow between, on the one hand, the user equipment and, on the other hand, a gateway node of the telecommunications network. The at least one service data flow includes data packets, the data packets including data packets being sent, by the user equipment, towards the telecommunications network, and data packets being sent, by the gateway node of the telecommunications network, towards the user equipment. The method includes using label information for indicating the at least one service data flow such that any data packet belonging to the at least one service data flow and being transmitted in a direction from the user equipment to the gateway node or in a direction from the gateway node to the user equipment includes the label information and/or is transmitted with the label information. The label information indicates: a termination point of the at least one service data flow, both termination points of the at least one service data flow, and/or a quality-of-service level to be applied to the service data flow.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide methods for handling communication between a telecommunications network and a user equipment, wherein the communication between the telecommunications network and the user equipment comprises at least one service data flow between, on the one hand, the user equipment and, on the other hand, the telecommunications network or a gateway node of the telecommunications network.

Furthermore, embodiments of the present invention provide telecommunications networks for handling communication between a telecommunications network and a user equipment, wherein the communication between the telecommunications network and the user equipment comprises at least one service data flow between, on the one hand, the user equipment and, on the other hand, the telecommunications network or a gateway node of the telecommunications network.

Additionally, embodiments of the present invention provide gateway nodes and user equipment for handling communication between a telecommunications network and a user equipment, wherein the communication between the telecommunications network and the user equipment comprises at least one service data flow between, on the one hand, the user equipment and, on the other hand, the telecommunications network or a gateway node of the telecommunications network.

Furthermore, embodiments of the present invention provide programs and computer program products for handling communication between a telecommunications network and a user equipment.

Embodiments of the present invention provide technically simple and effective solutions for flexibly handling communication between a telecommunications network and a user equipment, wherein the communication between the telecommunications network and the user equipment comprises at least one service data flow between, on the one hand, the user equipment (the user equipment being typically the termination point of the service data flow for downlink data packets), and, on the other hand, a gateway node of the telecommunications network (this gateway node—typically the packet data network gateway node being typically the termination point of the service data flow for uplink data packets).

Embodiments of the present invention provide methods for handling communication between a telecommunications network and a user equipment, wherein the communication between the telecommunications network and the user equipment comprises at least one service data flow between, on the one hand, the user equipment and, on the other hand, a gateway node of the telecommunications network. The at least one service data flow comprises data packets, and the data packets comprise data packets being sent, by the user equipment, towards the telecommunications network, and data packets being sent, by the gateway node of the telecommunications network, towards the user equipment. The methods include using label information to indicate the at least one service data flow such that any data packet belonging to the at least one service data flow and being transmitted in the direction from the user equipment to the gateway node or in the direction from the gateway node to the user equipment either comprises the label information or is transmitted with the label information. The label information is indicative of at least one out of: a termination point of the at least one service data flow, both termination points of the at least one service data flow, and a quality-of-service level to be applied to the service data flow.

According to embodiments of the present invention, an EPC bearer is no longer needed for providing the communication service of transmitting the service data flow between the user equipment and the telecommunications network (especially being a mobile communication network). When requiring the establishment of a bearer (or a PDP context) to provide data packet transmission between the user equipment and the telecommunications network, such a bearer is typically associated with a specific quality-of-service profile and/or with a specific packet data network. Embodiments of the present invention enable different service data flows to be assigned a specific quality-of-service profile and/or a specific packet data network and therefore to be handled independently from each other (in contrast to the case that such different service data flows would be transported within a bearer).

In a telecommunications network focused on the bearer concept, the PDN Gateways typically form the endpoints of the EPC bearers. However, not all packet data networks may be reachable from all PDN Gateways, depending on the configuration of the telecommunications network. Hence an appropriate PDN Gateway (one that connects to the desired packet data network as specified by the APN) is selected upon establishment of a PDN connection. It is therefore advantageously possible according to embodiments of the present invention to simplify the handling of data transmissions between the telecommunications network, on the one hand, and the user equipment, on the other hand.

Hence according to embodiments of the present invention, instead of establishing EPC bearer between a gateway node of the telecommunications network (especially a P-Gateway node of a mobile communication network) on the one hand, and a user equipment on the other hand, the data packets of the different service data flows are provided with a label information such that it is comparatively easily possible for any network node (that is aware of such label information) to apply the correct treatment (especially with respect to the transmission parameters to apply such as the quality-of-service profile and/or the endpoints (or destinations) of the data packets) to all data packets of a plurality of different service data flows. The data packets typically comprise data packets being sent, by the user equipment, towards the telecommunications network (i.e. uplink or upstream data packets), and data packets being sent, by the gateway node of the telecommunications network, towards the user equipment (i.e. downlink or downstream data packets).

According to embodiments of the present invention, the label information is used for indicating the at least one service data flow such that any data packet belonging to the at least one service data flow and being transmitted either uplink (i.e. upstream) or downlink (i.e. downstream) (i.e. either in the direction from the user equipment to the gateway node or in the direction from the gateway node to the user equipment) are associated with the respective label information (identifying the service data flow). According to various embodiments of the present invention, the data packets of the service data flow comprise the respective label information, i.e. as a part of the data packets, especially as part of the header portion of the data packets. According to various embodiments of the present invention, the data packets of the service data flow are transmitted with the label information, i.e. the label information is, strictly speaking, not part of the data packets. According to various embodiments of the present invention, it is possible that for a first service data flow (to be transported between the user equipment and the telecommunications network), the label information is transmitted as part of the data packets, and for a second service data flow (to be transported between the user equipment and the telecommunications network), the data packets of the service data flow are transmitted with the label information.

According to embodiments of the present invention, the label information is indicative of at least one or more of the group including: a termination point (especially defining the packet data network) of the at least one service data flow, both termination points (especially defining the user equipment and the packet data network) of the at least one service data flow, and a quality-of-service level (or quality-of-service profile) to be applied to the service data flow.

It is therefore advantageously possible to apply an enhanced flexibility in the transmission of different service data flow between the user equipment and the telecommunications network, especially a mobile communication network.

According to embodiments of the present invention, even though any data packet belonging to the at least one service data flow and being transmitted either uplink or downlink comprises—at some point between the user equipment and the gateway node—the use of the label information, it is—at least for uplink data packets—not necessarily the user equipment that provides the upstream marking (label information) of the data packets for the identification of the packet data network and/or the quality-of-service profile. This is especially preferred in case that the user equipment should not be involved in the determination of the uplink termination point or in case it is advantageous not to require to implement the inventive method in the user equipment (this might especially be the case if the label information is transmitted as part of the data packet (especially an IP packet)). In the latter case (that it is advantageous not to require to implement the inventive method in the user equipment), the label information would be removed also in the downlink data packets, e.g. by the eNodeB, prior to forwarding the data packet to the user equipment.

A user equipment typically uses (or at least a user equipment is able to use) a plurality of different service data flows. Therefore, "at least one service data flow" is used herein to describe one or a plurality of different service data flows. In situations where different service data flows are considered, in order to differentiate these different service data flows, the present document refers to the terms "first service data flow", "second service data flow", etc. However, typically the "at least one service data flow" can be identified with the "first service data flow".

According to a preferred embodiment of the present invention, the label information is indicative of a quality-of-service level to be applied to the service data flow, and of at least one out of a termination point of the at least one service data flow, and both termination points of the at least one service data flow.

By way of the label information being indicative of a quality-of-service level, or quality-of-service profile, (of the (first) service data flow), it is advantageously possible to provide a high degree of flexibility in handling different service data flows.

According to embodiments of the present invention it is furthermore preferred that the communication between the telecommunications network and the user equipment comprises, besides the first service data flow, a second service data flow between the user equipment and the gateway node, wherein the label information for indicating the first service data flow corresponds to a first label information and a second label information is used for indicating the second service data flow such that any data packet belonging to the second service data flow and being transmitted in the direction from the user equipment to the gateway node or in the direction from the gateway node to the user equipment either comprises the second label information or is transmitted with the second label information, wherein preferably the first service data flow comprises first uplink data packets and first downlink data packets, wherein the second service data flow comprises second uplink data packets and second downlink data packets.

By way of using a first label information for the first service data flow and a second label information for the second service data flow, it is advantageously possible that the different service data flows can be easily differentiated by the network nodes involved in transmitting these data packets. Especially, it is advantageously possible to avoid the application of a packet filter at each network node, especially also each intermediate network node between the gateway node and the user equipment.

It is possible and preferred according to embodiments of the present invention that the first label information forms meta information with respect to the data packets of the first service data flow and/or wherein the second label information forms meta information with respect to the data packets of the second service data flow, wherein preferably at least one of the data packets of the first service data flow and the data packets of the second service data flow are Internet Protocol (IP) data packets, and wherein preferably the first and/or second label information are part of custom or option fields in the header portion of the IP data packets or are part of the payload portion of the IP data packets.

It is thereby advantageously possible to transport the (first and second) label information as part of the data packets of the respective service data flow.

According to embodiments of the present invention it is preferred that prior to using the (first) label information for indicating the at least one first service data flow and/or the second label information for indicating the at least one second service data flow, an exchange of signaling information is performed such that the network nodes involved are made aware that the (first) label information is indicative of at least one termination point of the (first) service data flow and/or of a quality-of-service level to be applied to the (first) service data flow and/or that the second label information is indicative of at least one termination point of the second service data flow and/or of a quality-of-service level to be applied to the second service data flow.

By way of such an exchange of signaling information between the network nodes involved, it is advantageously possible to share the meaning of the label information of the respective service data flow, and hence realize a flexible yet correct handling of the data packets of the different service data flows.

According to a preferred embodiment of the present invention, the data packets of the first service data flow are matching a first packet filter, and the data packets of the second service data flow are matching a second packet filter such that using the first label information with respect to data packets belonging to the first service data flow and being transmitted in the direction from the user equipment to the gateway node or in the direction from the gateway node to the user equipment corresponds to applying the first packet filter and/or such that using the second label information with respect to data packets belonging to the second service data flow and being transmitted in the direction from the user equipment to the gateway node or in the direction from the gateway node to the user equipment corresponds to applying the second packet filter.

It is thereby advantageously possible to avoid to perform applying a packet filter at each network node involved.

Furthermore, embodiments of the present invention provide telecommunications networks for handling communication between a telecommunications network and a user equipment, wherein the communication between the telecommunications network and the user equipment comprises at least one service data flow between, on the one hand, the user equipment and, on the other hand, a gateway node of the telecommunications network, wherein the at least one service data flow comprises data packets, wherein the data packets comprise data packets being sent, by the user equipment, towards the telecommunications network, and data packets being sent, by the gateway node of the telecommunications network, towards the user equipment, wherein the telecommunications network is configured such that a label information is used for indicating the at least one service data flow such that any data packet belonging to the at least one service data flow and being transmitted in the direction from the user equipment to the gateway node or in the direction from the gateway node to the user equipment either comprises the label information or is transmitted with the label information, wherein the label information is indicative of at least one out of: a termination point of the at least one service data flow, both termination points of the at least one service data flow, and a quality-of-service level to be applied to the service data flow.

Thereby, it is advantageously possible that an EPC bearer is no longer needed for providing the communication service of transmitting the service data flow between the user equipment and the telecommunications network (especially being a mobile communication network). Embodiments of the present invention enable each service data flow to be transported between the user equipment and the telecommunications network, a specific quality-of-service profile and/or a specific packet data network is able to be assigned, hence making the handling of such data transmissions more flexible.

According to a further preferred embodiment of the present invention—especially with respect to the inventive telecommunications network—, the label information is indicative of a quality-of-service level to be applied to the service data flow, and of at least one out of a termination point of the at least one service data flow, and both termination points of the at least one service data flow.

Thereby, it is advantageously possible according to embodiments of the present invention to apply an enhanced flexibility in the transmission of different service data flows between the user equipment and the telecommunications network, especially a mobile communication network. Especially by means of the label information being indicative of a quality-of-service level, or quality-of-service profile, (of the (first) service data flow), it is advantageously possible to provide a high degree of flexibility in handling different service data flows.

According to still a further preferred embodiment of the present invention—especially with respect to the inventive telecommunications network—, the communication between the telecommunications network and the user equipment comprises, besides the first service data flow, a second service data flow between the user equipment and the gateway node, wherein the telecommunications network is configured such that the label information for indicating the first service data flow corresponds to a first label information and a second label information is used for indicating the second service data flow such that any data packet belonging to the second service data flow and being transmitted in the direction from the user equipment to the gateway node or in the direction from the gateway node to the user equipment either comprises the second label information or is transmitted with the second label information, wherein preferably the first service data flow comprises first uplink data packets and first downlink data packets, wherein the second service data flow comprises second uplink data packets and second downlink data packets.

According to still a further preferred embodiment of the present invention—especially with respect to the inventive telecommunications network—, the gateway node corresponds to a packet gateway node, wherein especially the telecommunications network comprises additional network nodes between the user equipment and the gateway node, wherein the additional network nodes especially comprise a serving gateway and/or an eNodeB node responsible for the user equipment.

By way of using a first label information for the first service data flow and a second label information for the second service data flow, it is advantageously possible that the different service data flows can be easily differentiated by network nodes such as additional network nodes between the user equipment and the gateway node, especially a serving gateway and/or an eNodeB node responsible for the user equipment.

Additionally, embodiments of the present invention provide gateway nodes of a telecommunications network for handling communication between the telecommunications network and a user equipment, wherein the communication between the telecommunications network and the user equipment comprises at least one service data flow between, on the one hand, the user equipment and, on the other hand, the gateway node of the telecommunications network, wherein the at least one service data flow comprises data packets, wherein the data packets comprise data packets being sent, by the user equipment, towards the telecommunications network, and data packets being sent, by the gateway node of the telecommunications network, towards the user equipment, wherein the gateway node is configured such as to generate and/or to interpret a label information, wherein the label information is used for indicating the at least one service data flow such that any data packet belonging to the at least one service data flow and being transmitted in the direction from the user equipment to the gateway node or in the direction from the gateway node to the user equipment either comprises the label information or is transmitted with the label information, wherein the label information is indicative of at least one out of a termination point of the at least one service data flow, both termination points of the at least one service data flow, and a quality-of-service level to be applied to the service data flow.

Furthermore, embodiments of the present invention provide user equipment of a telecommunications network for handling communication between the telecommunications network and the user equipment, wherein the communication between the telecommunications network and the user equipment comprises at least one service data flow between, on the one hand, the user equipment and, on the other hand, the gateway node of the telecommunications network, wherein the at least one service data flow comprises data packets, wherein the data packets comprise data packets being sent, by the user equipment, towards the telecommunications network, and data packets being sent, by the gateway node of the telecommunications network, towards the user equipment, wherein the user equipment is configured such as to generate and/or to interpret a label information, wherein the label information is used for indicating the at least one service data flow such that any data packet belonging to the at least one service data flow and being transmitted in the direction from the user equipment to the gateway node or in the direction from the gateway node to the user equipment either comprises the label information or is transmitted with the label information, wherein the label information is indicative of at least one out of a termination point of the at least one service data flow, both termination points of the at least one service data flow, and a quality-of-service level to be applied to the service data flow.

As an EPC bearer is no longer needed for providing the communication service of transmitting the service data flow between the user equipment and the telecommunications network (especially being a mobile communication network), it is advantageously possible by means of the inventive gateway node and by means of the inventive user equipment that each service data flow can be associated with or be assigned with a specific quality-of-service profile and/or a specific packet data network, hence making the handling of such data transmissions more flexible.

Additionally, embodiments of the present invention provide programs comprising computer readable program code which, when executed on a computer and/or on a network node of a telecommunications network, causes the computer and/or the network node of the telecommunications network to perform the inventive method.

Still additionally, embodiments of the present invention provide computer program products for handling communication between a telecommunications network and a user equipment, the computer program products comprising a computer program stored on a storage medium, the computer program comprising program code which, when executed on a computer and/or on a network node of a telecommunications network, causes the computer and/or the network node of the mobile communication network to perform the inventive method.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
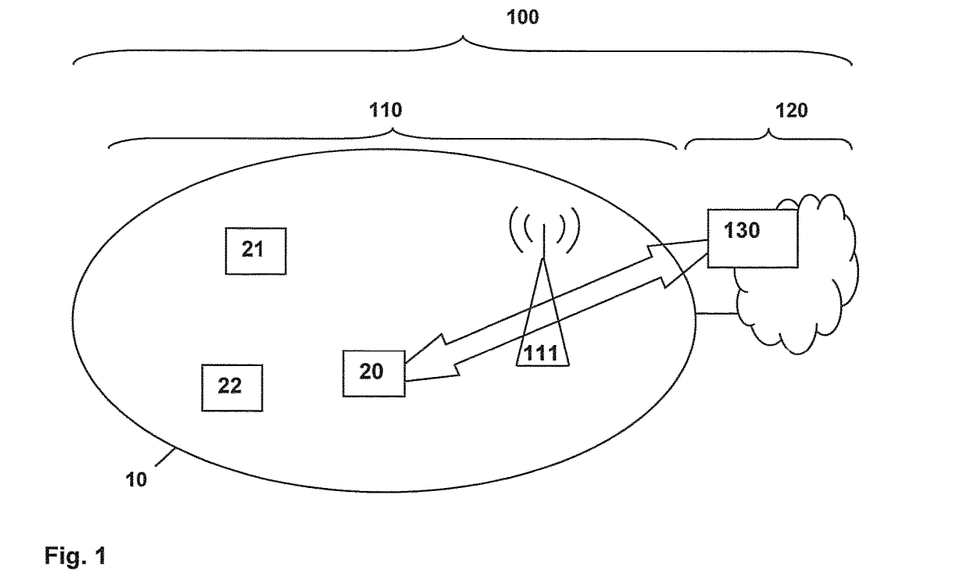
FIG. 1 schematically illustrates, as an example of a telecommunications network, a mobile communication network communicating with a user equipment connected to the mobile communication network.

In FIG. 1, a mobile communication network 100, especially a public land mobile network 100, is schematically shown as an example of a telecommunications network 100. The term "telecommunications network" is used herein to indicate that the telecommunications network 100 is not necessarily a mobile communication network. However, embodiments of the invention are explained herein primarily based on the example of the telecommunications network 100 being a mobile communication network 100. As an alternative to a mobile communication network as the inventive telecommunications network 100, a fixed line telecommunications network 100 can be considered, e.g. either in the form where user equipments (at least partly) have a wireline connection to the telecommunications network 100 and/or in the form where user equipments (at least partly) are wirelessly connected (at least regarding one meter or a couple of meters or 10 meters or a couple of 10 meters or 100 meters or a couple of 100 meters) to the telecommunications network 100 such as, e.g., using a WLAN or WIFI access to the telecommunications network.

In the exemplary embodiment represented in FIG. 1, the mobile communication network 100—as an example of the telecommunications network 100 according to an embodiment of the present invention—comprises an access network 110 and a core network 120. The telecommunications network 100/mobile communication network 100 is preferably a cellular telecommunications network comprising typically a plurality of network cells (or radio cells), one of which is represented in FIG. 1 by means of a solid line and reference sign 10. In the telecommunications network 100, typically a plurality of user equipments are camping on the telecommunications network 100 within the plurality of network cells or radio cells such as network cell 10 represented in FIG. 1, i.e. the user equipments are connected or are camping on a base station entity 111 that serves the radio cell 10. The base station entity 111 is typically a base station, e.g. BTS (base transceiver station), NodeB or an eNodeB base station.

The mobile communication network 100 generally serves a certain number of user equipments. In the exemplary representation of FIG. 1, a first user equipment 20, a second user equipment 21, and a third user equipment 22 are schematically represented.

The mobile communication network 100 comprises at least one network node providing a gateway functionality for the exchange of packet data from and to the user equipments 20, 21, 22. In the following, typically only one user equipment is considered; therefore, the user equipment is typically referred to by means of reference sign 20, i.e. regarding the first user equipment 20. Likewise, a double-sided arrow, representing a connection with packet data exchange between the first user equipment 20 and the telecommunications network 100 is schematically shown in FIG. 1 only with respect to the first user equipment 20. However, it is of course possible that also the other user equipments 21, 22 are supporting a connection with packet data exchange towards the telecommunications network 100. The network node providing the gateway functionality is also called gateway node 130 of the telecommunications network 100, and typically (or preferably) provides the functionality of the packet data network gateway or P-gateway. The packet gateway or packet data network gateway is responsible to act as a sort of anchor of mobility between 3GPP and non-3GPP technologies, and provides connectivity from the respective user equipment (such as the first user equipment 20) to external packet data networks (not represented in FIG. 1) by being the point of entry or exit of traffic for the respective user equipment (such as the first user equipment 20). The packet gateway typically manages policy enforcement, packet filtration for users, charging support and legal interception. The packet gateway typically provides packet filtering on a per-user basis, e.g. by deep packet inspection.

Typically within an inventive telecommunications network 100, there are additional intermediate network nodes between the user equipment 20 and the gateway node 130, wherein the additional network nodes especially comprise a serving gateway and/or an eNodeB node responsible for the user equipment 20. The additional intermediate network node of the serving gateway is not explicitly represented (and designated by a reference sign) in FIG. 1. In contrast, the additional intermediate network node of the base station entity (or eNodeB) is represented by means of the exemplarily base station entity 111 that serves the radio cell 10.

Without the establishment of an EPC bearer between the gateway node 130 on the one hand and the user equipment 20 on the other hand, packet filtering would need to be repeatedly done also by the additional intermediate network nodes. According to embodiments of the present invention, the efforts for necessarily conducting the repeated packet filtering can advantageously be avoided especially in case that the user equipment 20 requires a plurality of different service data flows by means of using a label information (i.e. a first label information indicating a first service data flow of a plurality of service data flows) for indicating the at least one service data flow (i.e. the first service data flow) such that any data packet belonging to the at least one service data flow and being transmitted in the direction from the user equipment 20 to the gateway node 130 or in the direction from the gateway node 130 to the user equipment 20 either comprises the (first) label information or is transmitted with the (first) label information (i.e. in addition to the (first) label information), wherein the (first) label information is indicative of at least one out of a termination point of the at least one service data flow (i.e. first service data flow), both termination points of the at least one service data flow (i.e. first service data flow), and a quality-of-service level to be applied to the (first) service data flow.

The label information indicative of the respective service data flow (i.e. the first label information indicating the first service data flow, the second label information indicating the second service data flow, etc.) needs to be shared or exchanged among or distributed to the concerned network nodes, i.e. the gateway node 130, the user equipment 20, as well as any additional intermediate network node, especially by means of exchanging signaling information such that the network nodes 20, 130 involved are made aware that the corresponding label information regarding each of the service data flows.

Figure 2:
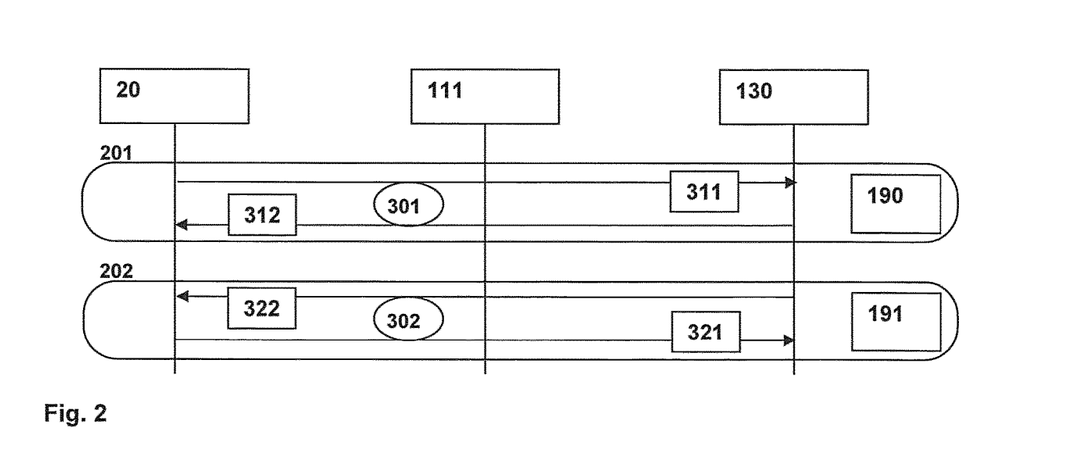
FIG. 2 schematically illustrates general communication, according to an embodiment of the present invention, between a user equipment, a base station entity of a mobile communication network and a gateway node of the mobile communication network.

In FIG. 2, the general communication according to an embodiment of the present invention between the user equipment 20, the base station entity 111 (as an example of an additional intermediate network node between the user equipment 20 and the gateway node 130) and the gateway node 130 of the mobile communication network 100 is schematically shown. Two service data flows are schematically shown: A first service data flow 201, and a second service data flow 202. However, more than these two service data flows 201, 202, i.e. additional service data flows, could be used by the user equipment 20. All service data flows 201, 202 comprise, over a certain period of time of their existence, a plurality of data packets, i.e. a plurality of data packets are associated to each of the different service data flows 201, 202 considered. All service data flows, 201, 202 typically comprise both uplink data packets (i.e. upstream data packets, being directed from the user equipment 20 to the gateway node 130) and downlink data packets (i.e. downstream data packets, being directed from the gateway node 130 to the user equipment 20). However, this is not necessarily the case for each and every service data flow (i.e. a service data flow could also comprise (or at least within a certain time window or time interval comprise) only upstream data packets or only downstream data packets).

In FIG. 2, the uplink data packets of the first service data flow 201 are indicated by means of reference sign 311 and referred to a first uplink data packets; the downlink data packets of the first service data flow 201 are indicated by means of reference sign 312 and referred to a first downlink data packets. The uplink data packets of the second service data flow 202 are indicated by means of reference sign 321 and referred to a second uplink data packets; the downlink data packets of the second service data flow 202 are indicated by means of reference sign 322 and referred to a second downlink data packets. The data packets of the first service data flow 201 either comprise or are transmitted with the first label information 301, and the data packets of the second service data flow 202 either comprise or are transmitted with the second label information 302. In addition to the gateway node 130, FIG. 2 also schematically shows a termination point 190 of the first service data flow 201 (also called first termination point 190), as well as a second termination point 191 of the second service data flow 202. The termination points 190, 191 indicate the packet data networks the user equipment 20 is exchanging data with by using the first service data flow 201 and the second service data flow 202, respectively.

It is especially advantageous that no bearer necessarily needs to be established between the user equipment 20 and the gateway node 130. The limitations of the use of (EPC) bearers (or PDP contexts) include the quality-of-service profile (or quality-of-service level) being associated to such bearers and not to service data flows. Due to this, different service data flows (that would be transmitted using one bearer) would need to be associated with the same quality-of-service profile and/or with the same packet filter, where in reality quality-of-service profiles should be applied to service data flows. Packet filters could be one possible means to identify a service data flow. The limitations of the use of (EPC) bearers (or PDP contexts) further include that there is no reason why a user equipment should use multiple IP addresses if it connects to multiple packet data networks, unless this is required by a particular packet data network (e.g. depending on the authority that assigns the IP address). Furthermore, the concept of bearers is specific to mobile networks and, hence, makes convergent networks that use other access systems difficult to achieve. Another aspect of the use of (EPC) bearers (or PDP contexts) is that, in the uplink direction, it is the user equipment that decides to which packet data network (or termination point) a certain data packet is directed to. When using bearers, the data packet is transmitted using the corresponding bearer, and there is no possibility for the telecommunications network to make the decision on behalf of the user equipment, or to change/override the decision of the user equipment.

According to embodiments of the present invention, the use of bearers is replaced by an approach where service data flows are defined and then a quality-of-service profile information and/or an information about termination points of the service data flow is assigned to the service data flow. This is performed by using label information assigned to each of different service data flows. E.g. in the example of a VoLTE user equipment, a quality-of-service profile for the IMS signaling flow (first service data flow 201) is assigned and this quality-of-service profile is applied to all SIP packets that flow to and from the user equipment (identified by its IP address). Whereas RTP packets (i.e. data packets according to the Real-time Transport Protocol) for a voice call would use another service data flow (second service data flow 202) with another quality-of-service profile. Furthermore, when the user equipment connects to the internet, yet another service data flow (third service data flow) needs to be defined.

With the inventive approach (i.e. avoiding the use of bearers), the manner how to send uplink packets to the correct PDN in conventional mobile communication networks (by means of the use of bearers) is no longer usable, as the user equipment might use the same IP address for communication with multiple packet data networks (and there are no bearers by which to identify the desired packet data network), and there would in conventional mobile communication networks be no way to differentiate the data packets of different service data flows and to know the correct packet data network (e.g. in the example mentioned above with aspects such as packet filter overlap between packet flows (service data flows) destined for different packet data networks).

Embodiments of the present invention proposes to avoid such drawbacks of conventional telecommunications networks, especially mobile communication networks, by means of a "bearer-less" network architecture (and a bearer-less treatment of data packets) such that all data packets belonging to the same service data flow get the same quality-of-service treatment, and are directed to the same packet data network (e.g. all SIP signaling packets to/from a given user equipment). Data packets that belong to another service data flow (e.g. "normal" Internet traffic) may have a different quality-of-service profile and be directed to a different packet data network. Both the user equipment and the telecommunications network know the service data flow and the associated quality-of-service profile.

According to embodiments of the present invention, it is proposed to solve the issue of how to know which data packets to route to which packet data network by means of adding a marking (i.e. the label information) to (the data packets of) each service data flow, i.e. the packets of this service data flow are marked with an service data flow-specific label, hence the label information specific for that service data flow. By using this marking or label information, it is advantageously possible according to embodiments of the present invention that even network elements on the flow path that do not know the service data flow description, can still differentiate the service data flows and assign each data packet to a given service data flow (of typically a plurality of service data flows associated with a typical user equipment); this allows such network nodes to both apply the correct quality-of-service treatment (without knowing or negotiating quality-of-service profiles with other elements), and it allows them to identify the packet data network (associated to the respective service data flow) in question by virtue of the label information assigned or related to the service data flow. According to a further embodiment of the present invention, it is preferably also possible that a network element (or a network node) within the packet flow (i.e. typically between the gateway nodes 130 and the user equipment 20) that is responsible for flow policing may change the marking (i.e. the label information for the respective service data flow), for reasons of at least one out of the following: translating/modifying quality-of-service treatment, and translating/modifying the packet's destination.

In any case, according to embodiments of the present invention, it is advantageously possible that such other network elements (or network nodes), including the user equipment except the gateway node, do not need to have a concept of a (or the correct) packet data network, as this is inherently and indirectly specified by the marking label, i.e. the respective label information.

The service data flow label (i.e. the label information) can also be used to select/identify a specific gateway node 130 of the telecommunications network 100 (such as a PDN Gateway) that can serve the packet data network specified by the label information of the considered service data flow 201, 202. According to a further preferred embodiment of the present invention, in case that a label information is to be assigned to a service data flow directed towards a specific packet data network, also the APN (access point name) can be used to specify the packet data network requested.

It is not necessarily the user equipment that provides the upstream marking of the packets for the identification of the packet data network. In fact, this could be completely hidden to the user equipment, and an element in the telecommunications network within the packet flow decides on the marking (or the label information) based on the knowledge of the service data flow and other information.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for handling communication between a telecommunications network and a user equipment, the communication between the telecommunications network and the user equipment including at least one service data flow between the user equipment and a gateway node of the telecommunications network, the method comprising:

communicating, as part of the at least one service flow, data packets between the gateway node and the user equipment using label information and without using any bearers such that the data packets are treated in a bearer-less manner, wherein any data packet belonging to the at least one service data flow and being transmitted in a direction from the user equipment to the gateway node or in a direction from the gateway node to the user equipment includes the label information and/or is transmitted with the label information, wherein the use of bearers is avoided based on the use of the label information, and wherein the label information indicates:
a termination point of the at least one service data flow, both termination points of the at least one service data flow, and/or
a quality-of-service level to be applied to the at least one service data flow;
wherein the communication between the telecommunications network and the user equipment includes a first service data flow and a second service data flow between the user equipment and the gateway node, wherein first label information corresponds to the first service data flow and second label information corresponds to the second service data flow;
wherein the first service data flow comprises first uplink data packets and first downlink data packets, and wherein the second service data flow comprises second uplink data packets and second downlink data packets;
wherein prior to using the first label information and/or the second label information, an exchange of signaling information is performed such that involved network nodes are made aware that the first label information is indicative of a quality-of-service level to be applied to the first service data flow and/or that the second label information is indicative of a quality-of-service level to be applied to the second service data flow.

2. The method according to claim 1, wherein the label information indicates the quality-of-service level to be applied to the at least one service data flow and one or more termination points of the at least one service data flow.

3. The method according to claim 1, wherein the first label information forms meta information with respect to the data packets of the first service data flow and/or wherein the second label information forms meta information with respect to the data packets of the second service data flow,
wherein at least one of the data packets of the first service data flow and the data packets of the second service data flow are Internet Protocol (IP) data packets, and
wherein the first label information and/or the second label information are part of custom or option fields in the header portion of the IP data packets or are part of the payload portion of the IP data packets.

4. The method according to claim 1, wherein the exchange of signaling information further makes the involved network nodes aware that the first label information is indicative of at least one termination point of the first service data flow and/or that the second label information is indicative of at least one termination point of the second service data flow.

5. The method according to claim 1, wherein the data packets of the first service data flow match a first packet filter and/or the data packets of the second service data flow match a second packet filter such that using the first label information with respect to data packets belonging to the first service data flow and being transmitted in the direction from the user equipment to the gateway node or in the direction from the gateway node to the user equipment corresponds to applying the first packet filter and/or such that using the second label information with respect to data packets belonging to the second service data flow and being transmitted in the direction from the user equipment to the gateway node or in the direction from the gateway node to the user equipment corresponds to applying the second packet filter.

6. The method according to claim 1, wherein the data packets being treated in the bearer-less manner comprises all data packets belonging to the same service data flow getting the same quality-of-service treatment and being directed to the same packet data network.

7. The method according to claim 1, wherein the at least one service flow includes a first IP Multimedia Subsystem (IMS) signaling service flow corresponding to a first quality-of-service profile and a second Real-time Transport Protocol (RTP) service flow corresponding to a second quality-of-service profile, wherein first label information is assigned to the first IMS signaling flow and second label information is assigned to the second RTP service flow.

8. The method according to claim 7, wherein the at least one service flow further includes a third service flow for connecting to the Internet, wherein third label information is assigned to the third service flow.

9. The method according to claim 1, wherein a network node between the gateway node and the user equipment that is responsible for flow policing changes respective label information for a respective service data flow to modify a quality-of-service treatment and/or modify a packet's destination.

10. The method according to claim 1, wherein the involved network nodes include the gateway node, the user equipment, and one or more additional intermediate network nodes.

11. A telecommunications network for handling communication between the telecommunications network and a user equipment, the communication between the telecommunications network and the user equipment including at least one service data flow between the user equipment and a gateway node of the telecommunications network,
wherein the telecommunications network is configured such that data packets are communicated, as part of the at least one service flow, between the gateway node and the user equipment using label information and without using any bearers such that the data packets are treated in a bearer-less manner, wherein any data packet belonging to the at least one service data flow and being transmitted in a direction from the user equipment to the gateway node or in a direction from the gateway node to the user equipment includes the label information and/or is transmitted with the label information, wherein the use of bearers is avoided based on the use of the label information, and wherein the label information indicates:
a termination point of the at least one service data flow, both termination points of the at least one service data flow, and/or
a quality-of-service level to be applied to the at least one service data flow;
wherein the communication between the telecommunications network and the user equipment includes a first service data flow and a second service data flow between the user equipment and the gateway node, wherein first label information corresponds to the first service data flow, and wherein second label information corresponds to the second service data flow;

wherein the first service data flow includes first uplink data packets and first downlink data packets, and wherein the second service data flow includes second uplink data packets and second downlink data packets;

wherein the telecommunications network is further configured such that, prior to using the first label information and/or the second label information, an exchange of signaling information is performed such that involved network nodes are made aware that the first label information is indicative of a quality-of-service level to be applied to the first service data flow and/or that the second label information is indicative of a quality-of-service level to be applied to the second service data flow.

12. The telecommunications network according to claim 11, wherein the label information indicates the quality-of-service level to be applied to the service data flow and one or more termination points of the at least one service data flow.

13. The telecommunications network according to claim 11, wherein the gateway node corresponds to a packet gateway node, wherein the telecommunications network includes additional network nodes between the user equipment and the gateway node, wherein the additional network nodes include a serving gateway and/or an eNodeB node responsible for the user equipment.

14. A first device of a telecommunications network for handling communication between the first device and a second device of the telecommunication network, the communication between the first device and the second device including at least one service data flow between the second device and the first device, wherein the first device comprises:
    a non-transitory memory;
    a processor; and
    a transceiver;
    wherein the non-transitory memory, the processor and the transceiver are configured to cooperate to facilitate:
    communicating, as part of the at least one service flow, data packets between the first device and the second device using label information and without using any bearers such that the data packets are treated in a bearer-less manner, wherein any data packet belonging to the at least one service data flow and being transmitted in a direction from the second device to the first device or in a direction from the first device to the second device includes the label information and/or is transmitted with the label information, wherein using the label information includes generating and/or interpreting the label information, wherein the use of bearers is avoided based on the use of the label information, and wherein the label information indicates:
        a termination point of the at least one service data flow, both termination points of the at least one service data flow, and/or
        a quality-of-service level to be applied to the at least one service data flow;
    wherein the communication between the first device and the second device includes a first service data flow and a second service data flow between the first device and the second device, wherein first label information corresponds to the first service data flow, and wherein second label information corresponds to the second service data flow;
    wherein the first service data flow includes first uplink data packets and first downlink data packets, and wherein the second service data flow includes second uplink data packets and second downlink data packets;
    wherein the wherein the non-transitory memory, the processor and the transceiver are further configured to cooperate to facilitate: prior to using the first label information and/or the second label information, exchanging signaling information such that involved network nodes are made aware that the first label information is indicative of a quality-of-service level to be applied to the first service data flow and/or that the second label information is indicative of a quality-of-service level to be applied to the second service data flow.

15. The first device according to claim 14, wherein the first device is a gateway node of the telecommunications network, and wherein the second device in communication with the first device is a user equipment of the telecommunications network.

16. The first device according to claim 14, wherein the first device is a user equipment of the telecommunications network, and wherein the second device in communication with the first device is a gateway node of the telecommunications network.

17. A non-transitory, computer-readable medium having processor-executable instructions stored thereon for handling communication between a telecommunications network and a user equipment, the communication between the telecommunications network and the user equipment including at least one service data flow between the user equipment and a gateway node of the telecommunications network, the processor-executable instructions, when executed, facilitating:
    communicating, as part of the at least one service flow, data packets between the gateway node and the user equipment using label information and without using any bearers such that the data packets are treated in a bearer-less manner, wherein any data packet belonging to the at least one service data flow and being transmitted in a direction from the user equipment to the gateway node or in a direction from the gateway node to the user equipment includes the label information and/or is transmitted with the label information, wherein the use of bearers is avoided based on the use of the label information, and wherein the label information indicates:
        a termination point of the at least one service data flow, both termination points of the at least one service data flow, and/or
        a quality-of-service level to be applied to the at least one service data flow;
    wherein the communication between the telecommunications network and the user equipment includes a first service data flow and a second service data flow between the user equipment and the gateway node, wherein first label information corresponds to the first service data flow and second label information corresponds to the second service data flow;
    wherein the first service data flow comprises first uplink data packets and first downlink data packets, and wherein the second service data flow comprises second uplink data packets and second downlink data packets;
    wherein the processor-executable instructions, when executed, further facilitate: prior to using the first label information and/or the second label information, performing an exchange of signaling information such that involved network nodes are made aware that the first label information is indicative of a quality-of-service level to be applied to the first service data flow and/or that the second label information is indicative of a quality-of-service level to be applied to the second service data flow.

* * * * *